July 23, 1957 L. B. BARTH 2,800,153
DOUBLE CHAIN SAW
Filed Nov. 14, 1952 4 Sheets-Sheet 4
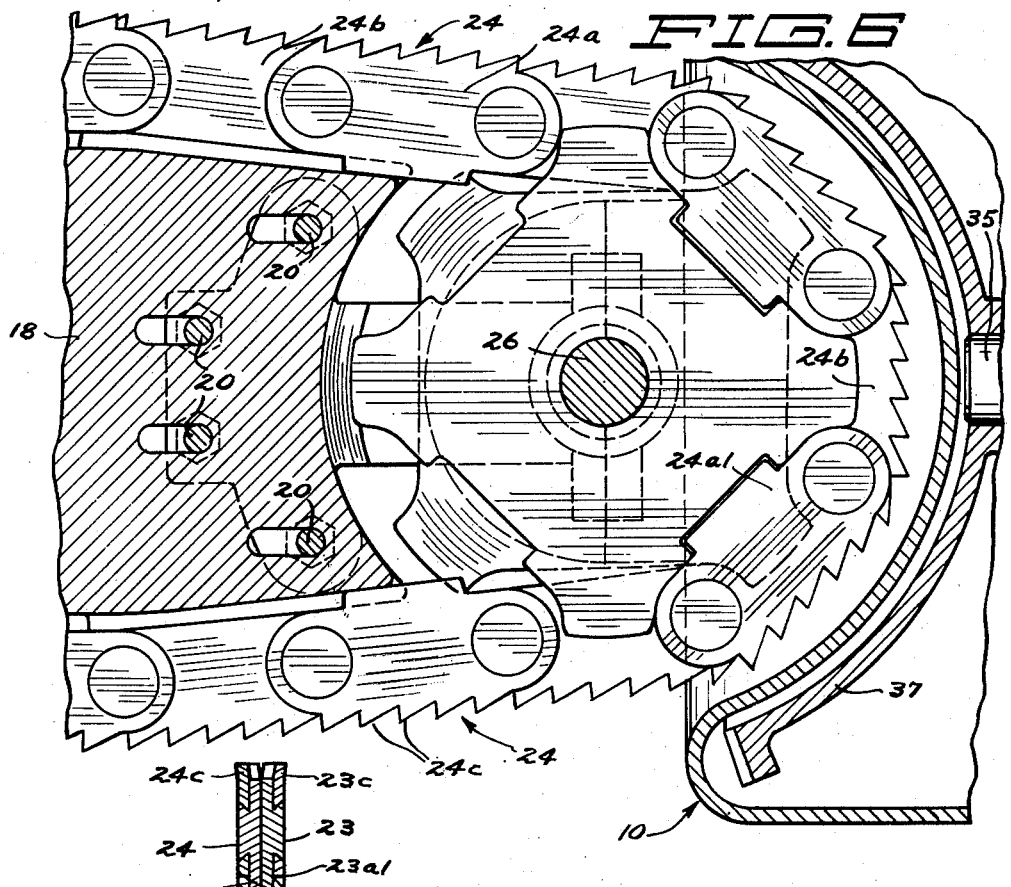
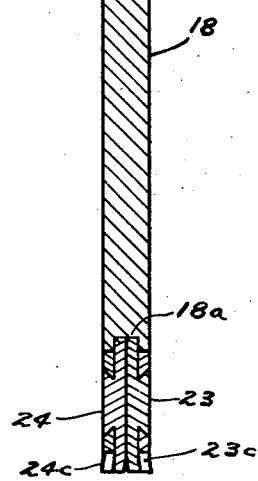
INVENTOR.
LUTHER B. BARTH
BY
Chas. C. Reyf
ATTORNEY

# United States Patent Office 2,800,153
Patented July 23, 1957

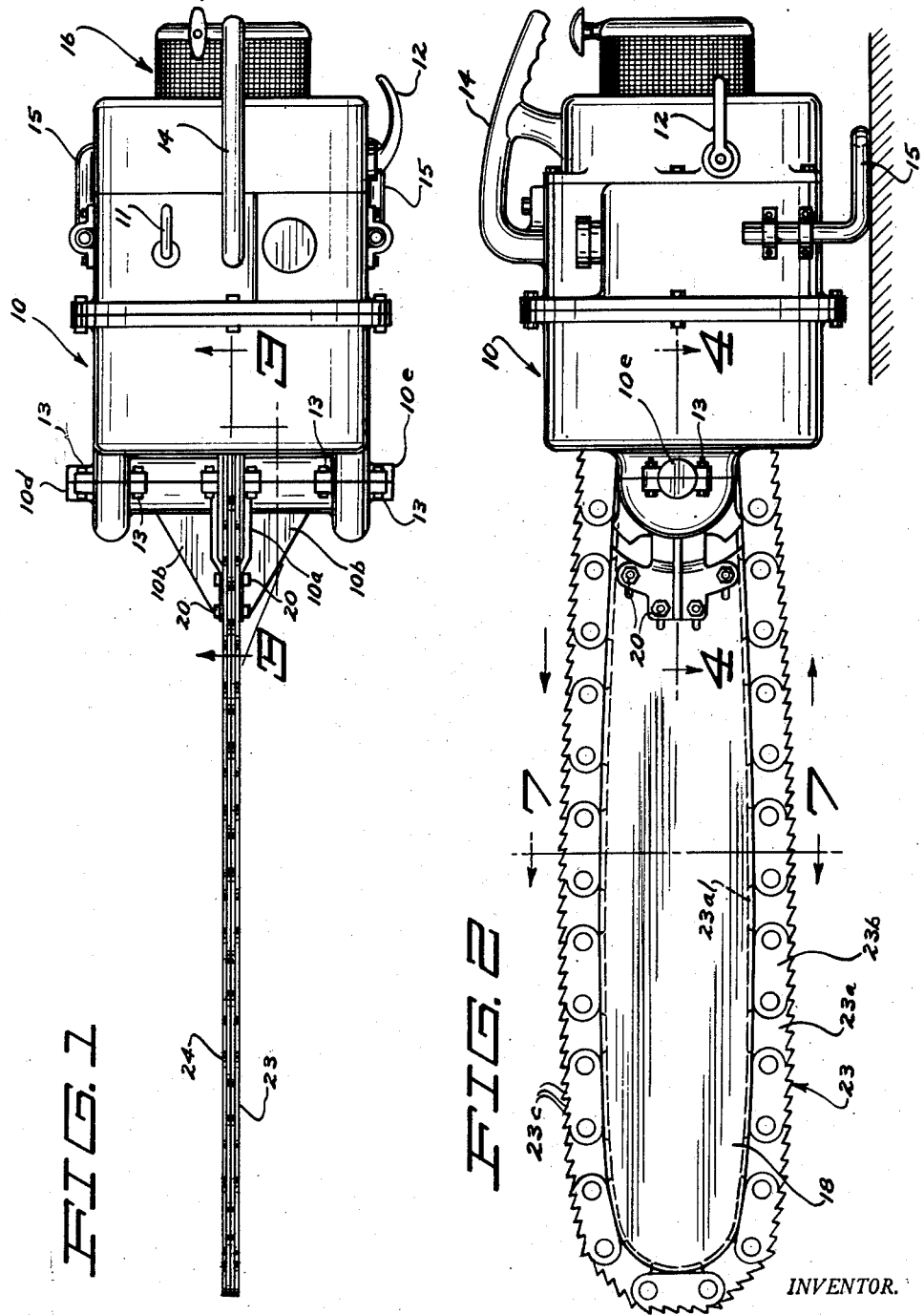

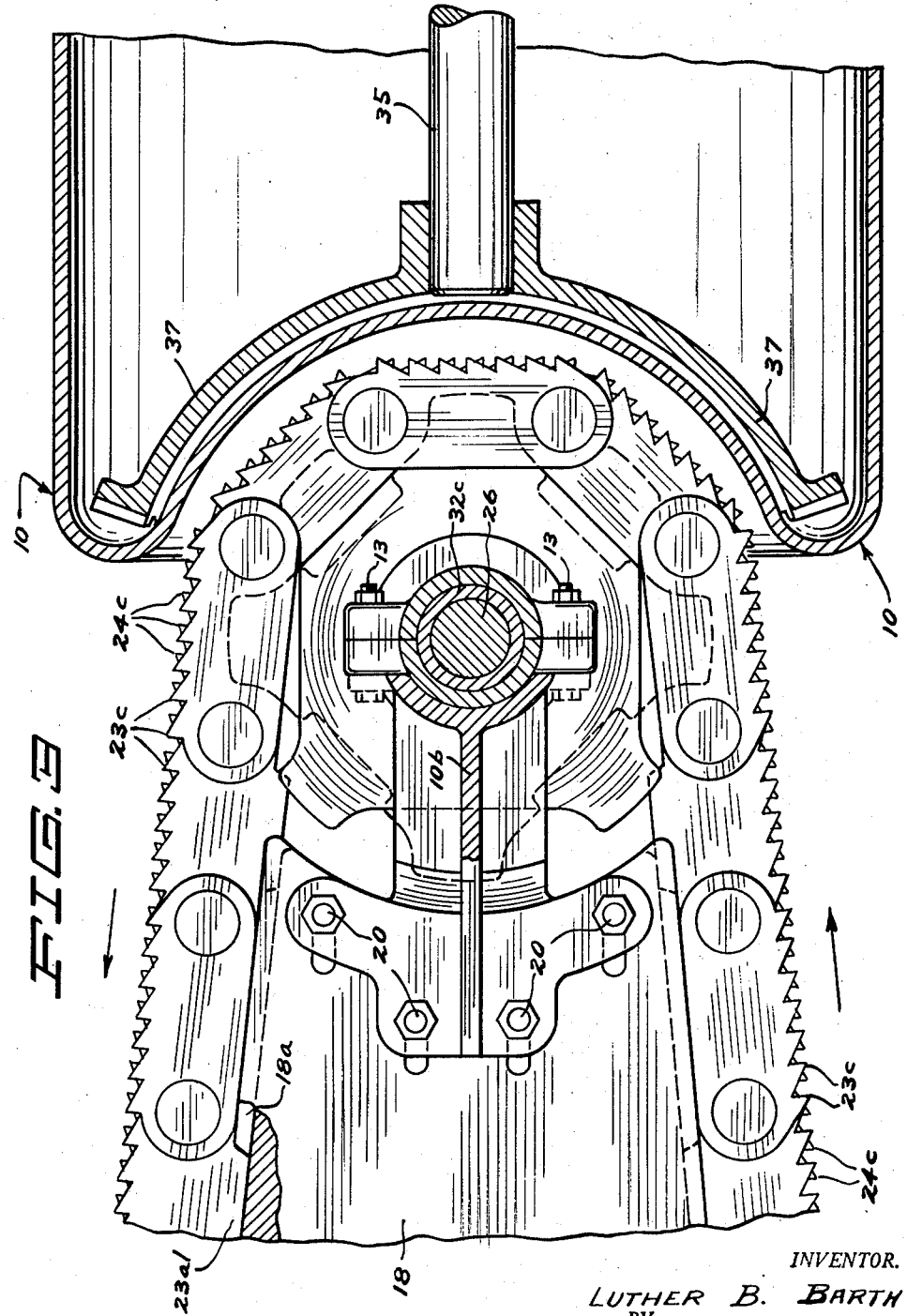

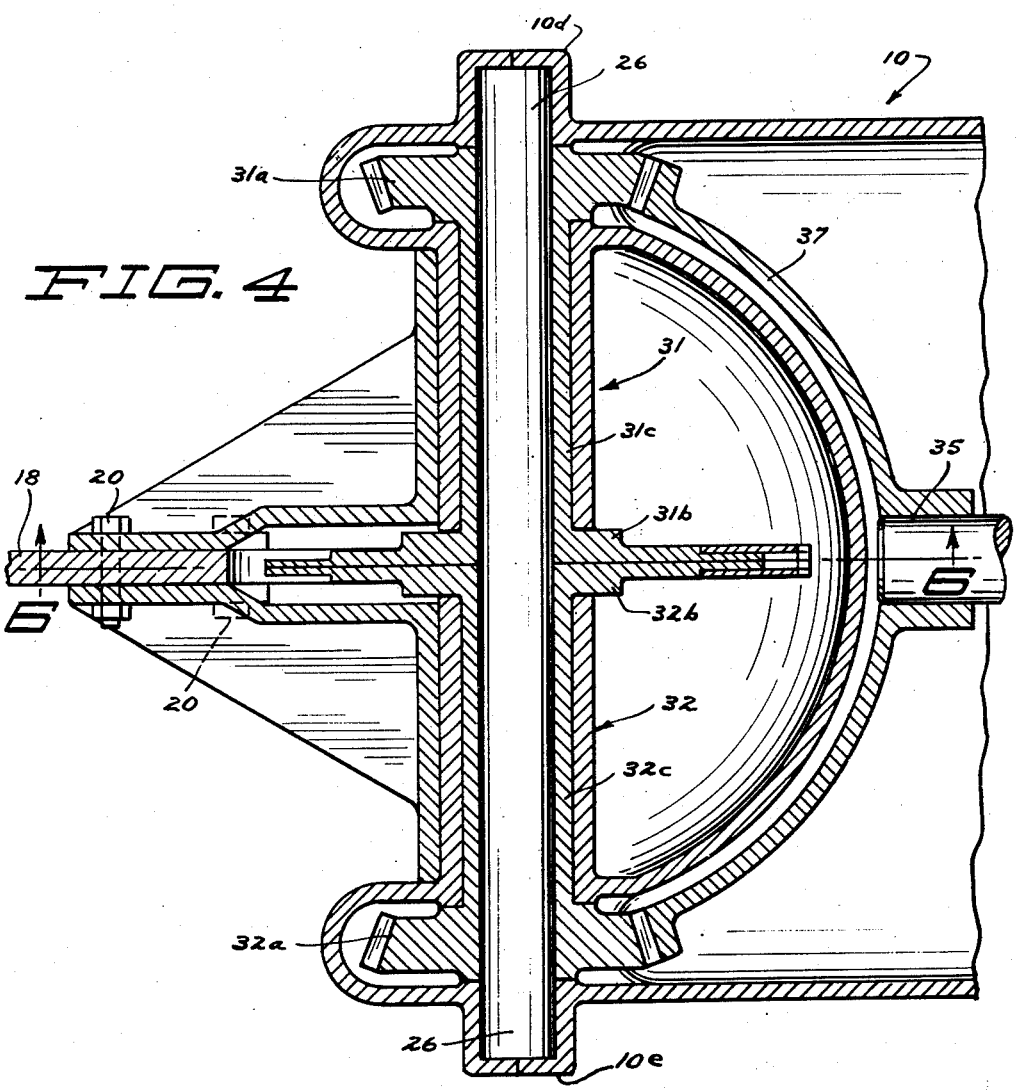
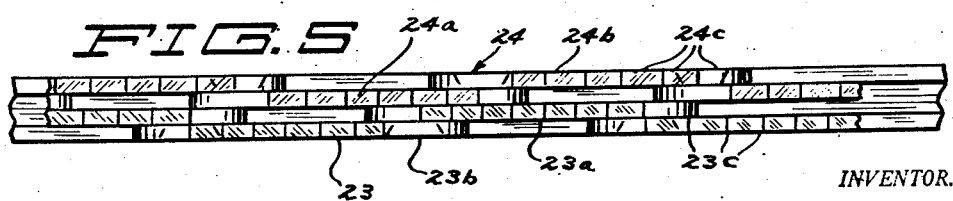

2,800,153
DOUBLE CHAIN SAW

Luther B. Barth, Glen, Minn., assignor of one-half to Logan J. Cromer, St. Paul, Minn.

Application November 14, 1952, Serial No. 320,374

4 Claims. (Cl. 143—32)

This invention relates to a power operated sawing device and particularly to the type known as a chain saw. Generally a chain saw has a tendency to jerk and kick back in operation and to jump out of its kerf or to cut a very uneven kerf when its cutting members contact knots of uneven texture in cutting trees, logs or other wood. It is highly desirable to have a chain saw which has a smooth cutting operation and which does not have a tendency to jerk and kick back in operation which makes its operation hazardous to the operator.

It is an object therefore of this invention to provide a chain saw which will operate without jerking or kicking back and without jumping out of its kerf, but which will cut an even kerf.

It is another object of this invention to provide a chain saw having cutting members carried on a pair of supports, said supports being adapted to be driven in opposite directions simultaneously to provide a smooth cutting operation.

It is still a further object of this invention to provide a chain saw having cutting members carried on a pair of adjacent endless tooth members, a member having a track thereabout for carrying said tooth members, and means for rotating said tooth members in opposite directions simultaneously.

It is a more specific object of this invention to provide a chain saw having cutting members carried on a pair of adjacent endless linked members, a member with a track thereabout providing for carrying said linked members, members for progressing said linked members in opposite directions simultaneously, and means provided for driving said last mentioned members.

These and other objects and advantages of the invention will be fully set forth in the following description made in connection with the accompanying drawings in which like reference characters refer to similar parts throughout the several views and in which:

Fig. 1 is a plan view of applicant's device;

Fig. 2 is a view taken in side elevation;

Fig. 3 is a view taken on line 3—3 of Fig. 1, as indicated by the arrows, with some parts shown in dotted lines;

Fig. 4 is a view taken on line 4—4 of Fig. 2, as indicated by the arrows;

Fig. 5 is a plan view of a portion of applicant's device;

Fig. 6 is a view taken on line 6—6 of Fig. 4, as indicated by the arrows; and

Fig. 7 is a view taken on line 7—7 of Fig. 2, as indicated by the arrows.

Referring to the drawings, a housing or casing 10 is shown. In the embodiment of the invention as illustrated, said casing is shown to be generally cylindrical. Control levers 11 and 12 are provided pivotally secured to said casing and being adapted to control the operation of a motor 16 mounted in said casing and extending outwardly therebehind for some distance. A clutch between the motor and saw may be used if desired. A handle 14 integral with said casing is provided for handling and guiding said saw. A member 15 is provided removably secured to said casing 10 and adapted to be used as a supporting member for said casing.

A chain supporting and guiding member 18 is provided. In the embodiment of the invention as illustrated, said member 18 is shown as a plate member of elongated oval form and having substantial thickness. A track 18a is provided about the outer end and sides of said member 18. Said track is shown as a right angled groove about said member 18 and the edges of said plate at each side of said groove. The inner end of said member 18 is received in and secured to a gear housing 10a which is integral with said casing 10. Said member 18 is secured in said housing 10a by headed and nutted bolts 20. Said housing 10a extends outwardly of said casing for some distance and has triangular rigs 10b disposed in planes at right angles to plate 18 and integral with said housing.

Movable about said member 18 are two endless chains 23 and 24. In the embodiment of the invention as illustrated, these are shown of link construction respectively comprising links 23a and 23b and 24a and 24b. Links 23a and 24a respectively have connecting portions extending laterally at their outer sides adjacent their ends and disposed through apertures provided in the adjacent links 23b and 24b respectively. The links of each chain overlap at their ends and said connecting portions are on the overlapping portions. Said connecting portions are swaged to provide pivotal connections between links 23a and 23b and 24a and 24b respectively. Links 23a and 24a have depending portions 23al and 24al which are receivable in groove 18a and links 23b and 24b are movable on the edges of plate members 18. Said like members having cutting teeth 23c and 24c integral with their outer edges. Said teeth 23c and 24c are disposed in opposite cutting relation to each other, or in other words, face in opposite directions. Said chains and their link members are engaged by a driving means adjacent the inner end of said member 18, as will presently be described.

Disposed in the front end portion of said casing 10 and extending transversely thereof is a bearing shaft 26. The ends of said bearing shaft 26 are disposed in hub members 10d and 10e which are formed integral with said casing 10 and bored to receive the ends of shaft 26. Said hubs and casing are divided along a diameter of said hubs to form a capped structure. The outer portion is removable and bolted to casing 10 by the spaced screws 13. Disposed over and rotatable on said bearing shaft 26 are gears 31 and 32. Said gears 31 and 32 are identical in structure and are reversely disposed on said bearing shaft 26. Said gears respectively comprise beveled gears 31a and 32a, sprockets 31b and 32b and connecting sleeves 31c and 32c. Said sprockets 31b and 32b are disposed adjacent or in engagement with one another and respectively engage chains 23 and 24. As shown in Fig. 3, the teeth of said sprockets respectively engage said chains by being received between the adjacent ends of links 23b and 24b respectively. A motor shaft or drive shaft 35 is provided. The same may be connected by a clutch (not shown) to said motor if it is so desired. Carried on said drive shaft 35 and movable therewith is a beveled gear 37 of semi-spherical form. Said gear meshes with beveled gears 31a and 32a.

In operation, the motor 16 will be started in the usual manner and said drive shaft 35 will be rotated by said motor. Said drive shaft will rotate beveled gear 37 and said gear 37 meshes with beveled gears 31a and 32a and will rotate gears 31 and 32 simultaneously. Hence said gears 31 and 32 will be rotated in opposite directions. Sprockets 31b and 32b engage link chains 23 and 24 respectively. Hence said chains will travel in opposite directions. The link members of said chains 23 and 24 carry cutting teeth 23c and 24c respectively and said cutting members moving in opposite directions will provide a smooth operation in cutting a common kerf.

Thus it is seen that I have provided a simply constructed chain saw adapted to operate efficiently and to give a very smooth operation and substantially eliminating all jerking and uneven motion. The oppositely moving cutting members make a clean cut kerf and provide a very efficient cutting operation.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A sawing device having in combination, a pair of adjacent endless chains comprising overlapping pivotally connected tooth-equipped links, an elongated plate member having a track extending about its edge, said chains adapted to move about said track, a pair of reversely disposed members each comprising a sprocket and a beveled gear, a bearing member having spaced alined bearing sleeves in which said first mentioned members are respectively journaled, said sprockets respectively adapted to mesh with said links, and a common gear having its opposite portions meshing with said beveled gears, and means for driving said common gear.

2. The structure set forth in claim 1, said bearing sleeves having flat adjacent ends and said sprockets being disposed between said bearing sleeves and having hub portions engaging said flat ends respectively.

3. A sawing device having in combination, a pair of chains formed of pivotally connected flat cutting links having teeth at their outer edges, said links of said respective chains being disposed in side by side engagement, a stationary guide member about which said chains travel, said guide member having a track having a substantially semi-circular end portion and having a groove in its periphery in which said links are disposed, the planes of said chains being at right angles to the axis of said semi-circular end portion, and means for driving said chains in opposite directions about said guide member for cutting a common kerf whereby the portions of said chains about the outwardly extending portion of said guide member are unobstructed.

4. The structure set forth in claim 3, each chain comprising adjacent links in overlapping relation to maintain said links in a substantially even spaced relationship.

References Cited in the file of this patent

UNITED STATES PATENTS

| 12,327 | Russel | Jan. 30, 1855 |
| 845,547 | Hathaway | Feb. 26, 1907 |
| 939,438 | Nielsen | Nov. 9, 1909 |
| 1,553,672 | De Northall | Sept. 15, 1925 |
| 1,559,522 | Frunk | Oct. 27, 1925 |
| 1,703,941 | McArthur | Mar. 5, 1929 |
| 1,710,970 | De Northall | Apr. 30, 1929 |
| 2,555,428 | Tuttle | June 5, 1951 |
| 2,664,925 | Jacobs | Jan. 5, 1954 |

FOREIGN PATENTS

| 102,416 | Great Britain | Dec. 7, 1916 |